Feb. 16, 1943.  V. M. EBBS  2,311,525
SUCTION HOLDING DEVICE
Filed Aug. 12, 1942
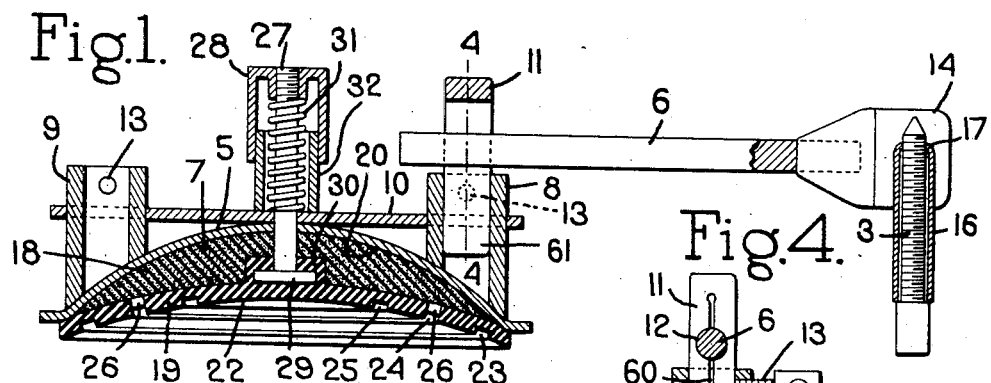
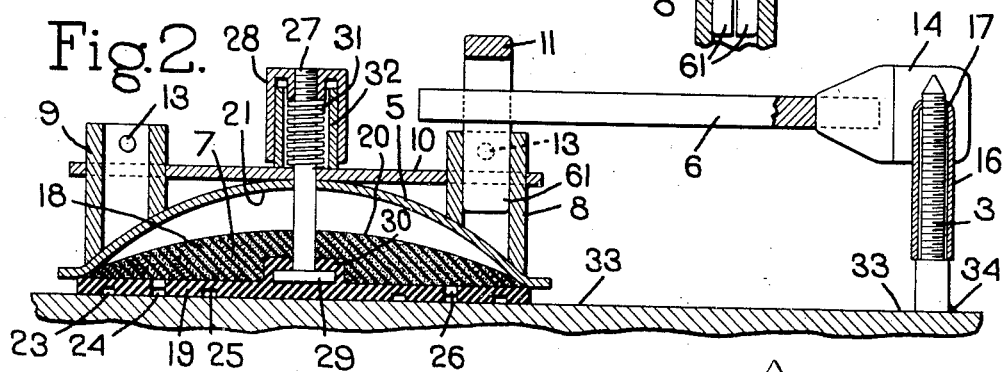
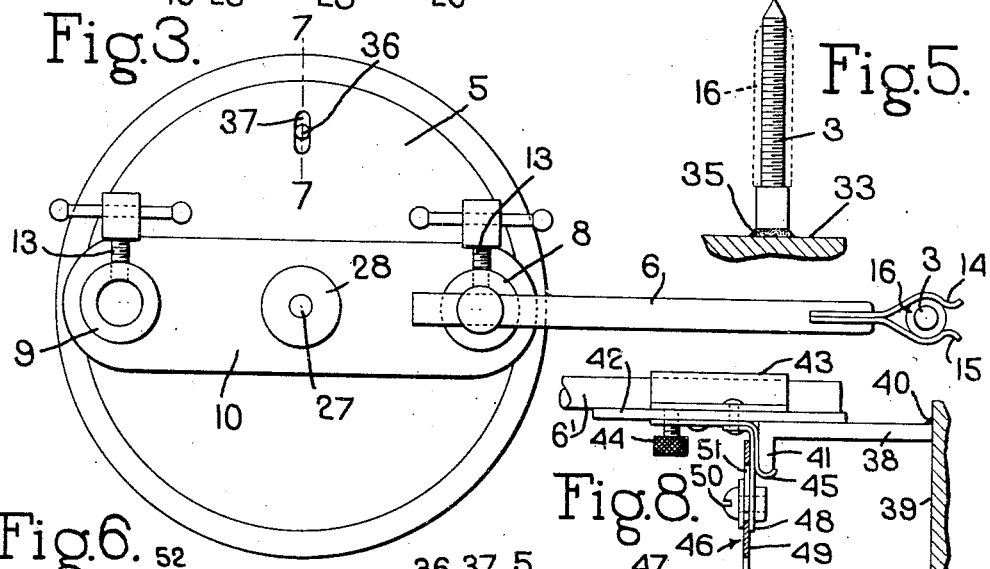
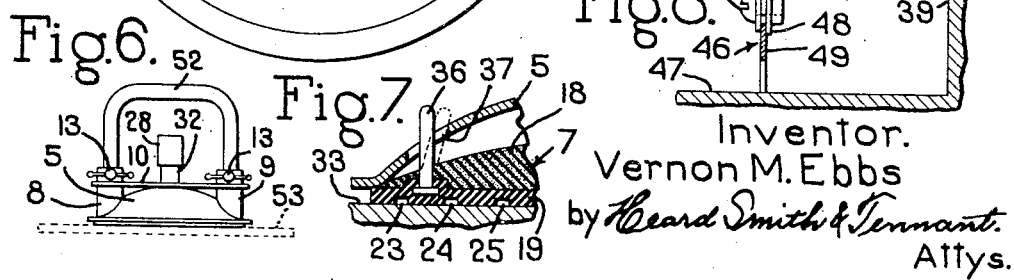
Inventor.
Vernon M. Ebbs
by Heard Smith & Tennant.
Attys.

Patented Feb. 16, 1943

2,311,525

UNITED STATES PATENT OFFICE 2,311,525

SUCTION HOLDING DEVICE

Vernon M. Ebbs, Somerville, Mass., assignor of one-half to William F. Heavey, East Milton, Mass.

Application August 12, 1942, Serial No. 454,612

6 Claims. (Cl. 248—206)

This invention relates to a suction holding device, and while it is capable of a wide range of usefulness, I have found it especially useful in holding small articles in position while they are to be welded to a metal surface.

In many manufacturing operations it is necessary to weld a small article, such as a screw stud or a bracket, to a metal floor or a metal wall or a metal ceiling. In thus welding small articles to a wall or ceiling, it has been the common practice for an attendant to hold the article in the position in which it is to be welded while the welder performs the welding operation. For this purpose, the attendant frequently uses a wooden stick or holder by which the article is held in position. It is often difficult, however, for the attendant to hold the article in exactly the correct position for the welding operation, and if the article is being welded to the ceiling or to some overhead structure, the welding operation often results in showering the attendant with sparks.

My invention provides a simple holder for such articles which can be readily placed in any position on a floor, wall, or ceiling and which will accurately hold the article in correct position while the welding operation is being performed.

In order to give an understanding of my invention, I have illustrated in the drawing some selected embodiments thereof which will now be described, after which the novel features will be pointed out in the appended claims.

In the drawing:

Fig. 1 is a sectional view through a device embodying my invention.

Fig. 2 is a sectional view showing the device in operation.

Fig. 3 is a plan view of Fig. 1.

Fig. 4 is a section on the line 4—4, Fig. 1.

Fig. 5 illustrates the type of article which is being welded to a surface by the device shown in Figs. 1, 2, and 4.

Fig. 6 is a view illustrating a different embodiment of my invention.

Fig. 7 is a section on the line 7—7, Fig. 3.

Fig. 8 is a fragmentary view illustrating an embodiment of the invention adapted to hold a bracket while being welded to a wall.

As stated above my invention is capable of a wide range of uses and is adapted for holding a great number of different articles for different purposes. The device shown in Figs. 1 to 4 has been especially designed for holding in position a screw stud 3 while the head of the stud is being welded to a metal surface 33.

The holding device embodying the invention is provided with a body member 5, herein shown as concavo-convex in shape, a holding arm 6 secured to and extending from the body member and provided with means for holding the article, such as the screw stud 3, in the desired position, and a suction member 7 associated with the body member 5 and by which the holder may be held to the supporting surface by suction.

The body member 5 is shown as having two hollow posts or bosses 8 and 9 extending from the back face thereof, said posts being herein shown as connected by a strap 10 having apertures in its ends through which the posts extend and which engages the dome of the concavo-convex body member 5. This connecting strap 10 can be welded to the posts and the body member, and the posts may be secured to the body member 5 in any appropriate way as by means of welding. The holding arm 6 is shown as being adjustably mounted in a clamping member 11 which in turn is adapted to be adjustably mounted in one of the posts 8 or 9.

The clamping member 11 is shown as being bifurcated at its lower end and is provided with a transverse opening 12 of a size to receive the inner end of the arm 6. A clamp screw 13 screw-threaded into the post 8 serves not only to retain the clamping member 11 in position but also serves to tighten the two legs 61 of the clamping member tightly about the arm 6, thereby clamping the arm securely in the clamping member.

When the clamping screw 13 is loosened, the clamping member 11 can be raised or lowered in the post 8, and the holding arm 6 can be adjusted transversely in the clamping member. When the clamping screw 13 is tightened the arm 6 will be rigidly held in its adjusted position.

In the device shown in Figs. 1, 2 and 3, the holding arm 6 carries at its outer end a pair of resilient jaws 14 and 15 which are shaped to receive the article that is to be held in position. In the case of a screw stud 3 I propose to employ a shield 16 which fits over the screw thread portion of the stud and the end of which is turned inwardly slightly as shown at 17 and is provided with screw threads to engage the screw threads of the stud. This protector sleeve serves not only to protect the threads of the stud during the welding operation, but it also provides a means by which the stud can be retained in the clamping jaws 14 and 15.

The suction member 7 by which the holder is temporarily held in position is formed with a back section 18 of sponge rubber and a front or face section 19 of rubber or rubberlike material, said two sections being united in any usual or suitable way. The combined sections 18 and 19 normally have a concavo-convex shape, the backing section 18 having a convex face 20 which normally fits the concave face 21 of the body member 5, and the front or suction section 19 normally has a concave face 22 which constitutes the suction face of the suction holder.

This suction face 22 will preferably be provided with a plurality of concentric annular grooves, three such grooves 23, 24, and 25 being herein illustrated. The face section 19 is also provided with a plurality of apertures 26 extending therethrough, these apertures being shown as formed in the intermediate groove 24.

Secured to the suction member is a stem 27 which extends through the body member and the plate 10 and which is provided at its end with a head or cap 28. The inner end of this stem may be secured to the suction member in any approved way and as herein shown said stem is formed with a head 29 which is molded into the central portion 30 of the face section 19.

The stem 27 is acted on by a spring 31 which normally tends to move the stem outwardly. This spring is a coil spring which surrounds the stem and is received in a thimble 32 which is secured to the plate 10 and which fits within the cap 28.

In order to attach the holder to a surface such as the surface 33, the device will be placed on the surface at the desired location and then pressure will be applied to the cap 28 thereby compressing the spring 31 and forcing the central portion of the suction member 7 forwardly to bring the suction face 22 into close intimate contact with the surface 33.

The suction between the suction face 22 and the surface 33 holds the stem in the position shown in Fig. 2 and the compressed spring 31 causes the peripheral portion of the body member 5 to apply pressure to the periphery of the suction member thereby augmenting the suction grip between said member and the surface 33.

It is intended that the sponge rubber section 18 of the suction device should be loaded with moisture before the device is applied to the surface 33, and when the pressure is applied to the cap 28 to bring the suction face into close and intimate contact with the surface 33, some of the water or moisture in the sponge rubber will be forced out through the apertures 26 into the groove 24, and this moisture will be sufficient in amount not only to fill the groove 24 but to flow over the suction face 22 thereby wetting said face sufficiently so as to provide a strong suction grip between the suction face and the surface 33.

In using the device for holding a screw stud 3 in position to be welded on to a surface 33, the stud enclosed in its shield 16 may be properly placed in the clamping jaws 14 and 15, and then the holder will be placed on the surface 33 in a position to locate the stud 3 at the point where it is to be welded. By applying pressure to the cap 28, the suction face will be caused to adhere by suction to the surface 33 and thereby the stud 3 will be properly located and will be properly held in position while the welding operation is being performed. This holder thus dispenses with the use of an attendant for holding the screw stud or other article during the welding operation.

In thus welding a stud to a surface 33, it is common practice to merely tack-weld the stud at first and then subsequently to complete the welding operation. This method may also be carried out in connection with my improvements, for when the stud is held in proper position as shown in Fig. 2 the welder may tack-weld the head of the stud to the surface as shown at 34 and then the holder can be removed, leaving the stud thus held in position, and may be used for holding another stud which is to be tack-welded in place.

After the studs have been thus tack-welded, then at a subsequent time, the welder may complete the welding operation by welding the entire head end of the stud to the surface as shown at 35 in Fig. 5.

To facilitate the removal of the holder after it has accomplished its purpose, I have provided a simple means for breaking the suction between the suction face 22 and the surface 33. The suction member is shown as provided with a releasing stud 36 which is located adjacent the periphery of the suction member and which extends upwardly through an enlarged opening 37 in the body member 5. By pressing on this releasing pin 36 so as to tip it into the dotted line position Fig. 7, the peripheral edge of the suction member will be deformed sufficiently to break the suction so that the holder is free to be removed.

In Fig. 8 I have shown a different embodiment of the invention which is adapted for holding a bracket 38 against a wall 39 while it is being welded thereto as shown at 40. The bracket 38 is shown as having a depending flange 41 and the retainer which is designed to carry this bracket is shown as adjustably mounted on an arm 6' similar to the holding arm 6 in Figs. 1 and 2. Said retainer comprises a plate 42 having a strap 43 secured to its upper face that embraces the end of the rod 6', said plate and strap being adjustable on the rod and being secured in adjusted position by a clamping screw 44. This retainer is also formed with a lip 45 adapted to engage the flange 41, the edge of the lip being bent to form a seat for the edge of said flange. The bracket 38 is thus held between the plate 40 and the lip 45.

The device is also shown as equipped with an adjustable leg 46 which is adapted to rest on the surface 47 to which the suction member is to be attached. This leg 46 is adjustable in length and comprises the two members 48 and 49 which are clamped together by a clamping screw 50. The leg member 49 is provided with a slot 51 through which the screw extends and this provides for varying the length of the leg according to the position on the wall 39 at which the bracket 38 is to be welded. It will be understood that the arm 6' is mounted on a suction holding device such as shown in Figs. 1 and 2.

I have above described my invention as it might be used in holding a small article in place while it is to be welded to a wall or some other surface. My invention is also capable of other uses such for instance as carrying metal plates or sheets, and Fig. 6 shows it thus used. When the device is to be used for this purpose, the clamp 11 is removed from the post 8 and a U-shaped handle 52 is employed, the ends of the two legs of the handle being inserted into the hollow posts 8 and 9 and being clamped therein by the clamping screws 13. The device thus equipped with the handle 52 may then be placed on the sheet or plate 53 which is to be transported and by manipulating the cap 28 as above described, the suction member will become attached by suction to the plate or sheet 53 and the device may then be used for manually transporting the plate or sheet.

I claim:

1. A holder of the class described comprising a body member having a concavo-convex shape, an arm adjustably carried by and extending from the body member and having means to hold the article in position, a suction member associated with the concave face of the body member and normally having a concave suction face, a stem secured to the suction member and extending through the body member and by which the concave suction face of the suction member may be forced into suction contact with a surface to which the holder is to be temporarily attached, and spring means placed under compression by the depression of the stem, said compressed spring acting through the body member to apply pressure to the peripheral portion of the suction member.

2. A holder of the class described comprising a body member, an arm carried thereby and extending therefrom and having means to hold an article, a suction member associated with the body member and normally having a concave suction face, means to force the suction face into intimate contact with a surface to which the holder is to be temporarily attached, and a suction-releasing stem secured to the suction member adjacent its periphery and by which the suction face may be distorted sufficiently to relieve the suction when the holder is to be removed from said surface.

3. A holder of the class described comprising a body member having concavo-convex shape, an arm extending from the body member and provided with means to hold an article, a suction member associated with said body member and normally having a concave suction face, a stem secured to the suction member and extending through the body member and by which the concave face of the suction member may be forced into intimate suction contact with a surface to which the holder is to be temporarily attached, said body member having a slot adjacent its periphery, and a suction-releasing stem secured to the marginal portion of the suction member and extending through said slot.

4. A suction holding device comprising a body member having concavo-convex shape, a suction member having a back section of sponge rubber and an apertured front section providing a normally concave suction face, a stem secured to the suction member and extending through the body member, whereby pressure applied to the stem will force the suction face of the suction member into intimate suction contact with a surface to which the holding device is to be temporarily attached and moisture with which the sponge rubber section has been loaded will be forced out through the apertures of the front section thereby moistening the suction face.

5. A suction holding device comprising a body member having a concave front face and also having two hollow posts extending from the back side thereof at diametrically opposite points, a suction member on the front side of the body member, said suction member normally having a concave suction face, a stem secured to said suction member and extending through the body member, a head on the outer end of said stem and a spring interposed between the head and the body member whereby pressure applied to said head forces the central portion of the suction member away from the body member and brings the suction face of the suction member into intimate contact with the surface to which the holding device is to be attached, and also compresses the spring thereby causing the peripheral portion of the body member to apply a continuing pressure to the peripheral portion of the suction member.

6. A suction holding device comprising a body member having concavo-convex shape, a hollow post extending from the backside of said member, a bifurcated clamping member fitting within said post and provided with a transverse opening, an arm mounted in said opening and having at its free end a pair of clamping jaws, a clamping screw carried by said post and engaging the bifurcated clamping member thereby securing said member in the post and also clamping said arm between the two sides of said member, a suction member on the front side of the body member, said suction member normally having a concave suction face, and a stem secured to the suction member and extending through the body member and by which the concave suction face of said suction member may be forced into intimate contact with the surface to which the holder is to be attached.

VERNON M. EBBS.